(12) United States Patent
Sakata

(10) Patent No.: US 6,343,316 B1
(45) Date of Patent: Jan. 29, 2002

(54) COOPERATIVE WORK SUPPORT SYSTEM

(75) Inventor: Kazuhiro Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/247,596

(22) Filed: Feb. 10, 1999

(30) Foreign Application Priority Data

Feb. 13, 1998 (JP) .......................................... 10-031063

(51) Int. Cl.$^7$ ............................................ G06F 15/167
(52) U.S. Cl. .......................... 709/213; 709/105; 707/4; 707/204; 707/205; 707/102
(58) Field of Search ................... 709/201, 213, 709/214, 215, 216, 105; 707/4, 102, 204–205

(56) References Cited

U.S. PATENT DOCUMENTS

| 4,495,570 A | * | 1/1985 | Kitajima et al. ............. 364/200 |
| 5,999,968 A | * | 12/1999 | Tsuda .......................... 709/213 |
| 6,192,415 B1 | * | 2/2001 | Harerstock et al. ......... 709/245 |

FOREIGN PATENT DOCUMENTS

| JP | 6-12388 | 1/1994 |
| JP | 7-225732 | 8/1995 |
| JP | 9-190412 | 7/1997 |
| JP | 9-231044 | 9/1997 |

* cited by examiner

Primary Examiner—Glenton B. Burgess
Assistant Examiner—Hien C. Le
(74) Attorney, Agent, or Firm—Sughrue Mion, PLLC

(57) ABSTRACT

The cooperative work support system of the present invention has at least a first terminal and a second terminal in a communication network, wherein each terminal comprises: a file system for storing a shared file; a file transmitter for transmitting the shared file between the first terminal and the second terminal; and a sharable file list manager for registering shared file information into a sharable file list. The sharable file list manager in the second terminal determines whether the shared file exists within the second terminal based on the shared file information, and sends a transmission request to request the first terminal to transmit the shared file to the second terminal when the shared file does not exist within the second terminal. The file transmitter in the first terminal sends the shared file from the first terminal to the second terminal through the communication network in response to the transmission request. The sharable file list manager in the second terminal updates the shared file information in the sharable file list in the second terminal after the transmission of the shared file.

22 Claims, 10 Drawing Sheets

FIG.3

| SHARED FILE NAME | PROVIDER TERMINAL | TRANSMISSION FLAG | POSITION IN FILE SYSTEM | SHARING TIME |
|---|---|---|---|---|
| data1.txt | violin | 1 | a:/app/data/data1.txt | PERMANENT |
| data23.txt | piano | 0 | b:/archive/data2.txt | TEMPORARY |
| prog1.exe | (local) | 1 | a:/programs/prog1.exe | PERMANENT |
| prog38.exe | violin | 0 | c:/temp/app.exe | PERMANENT |

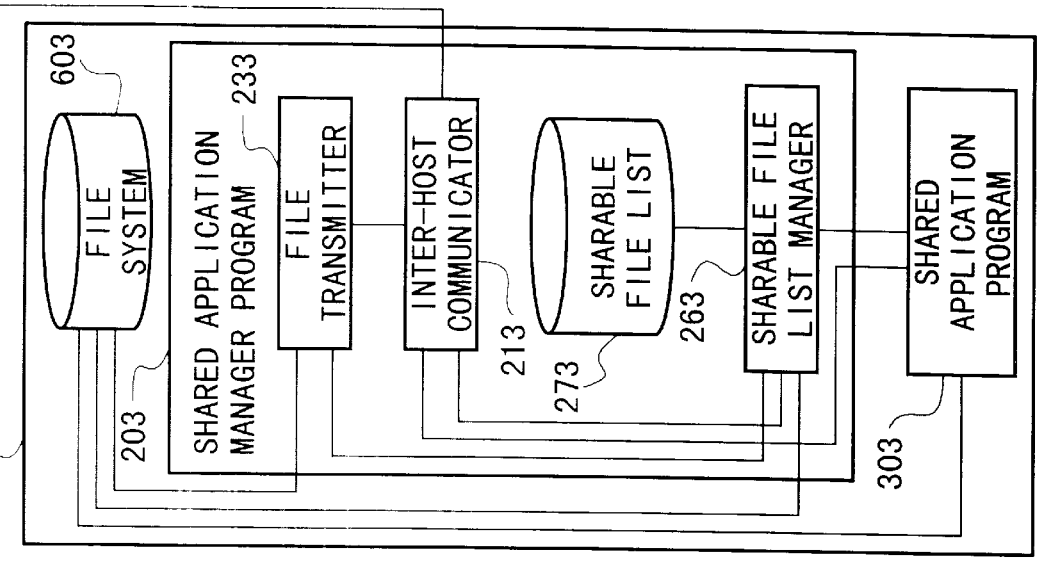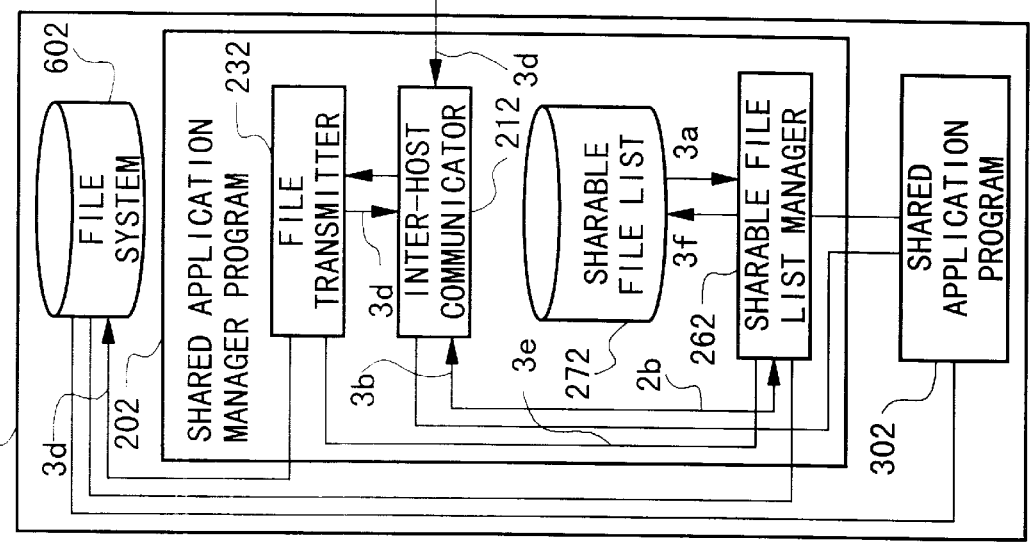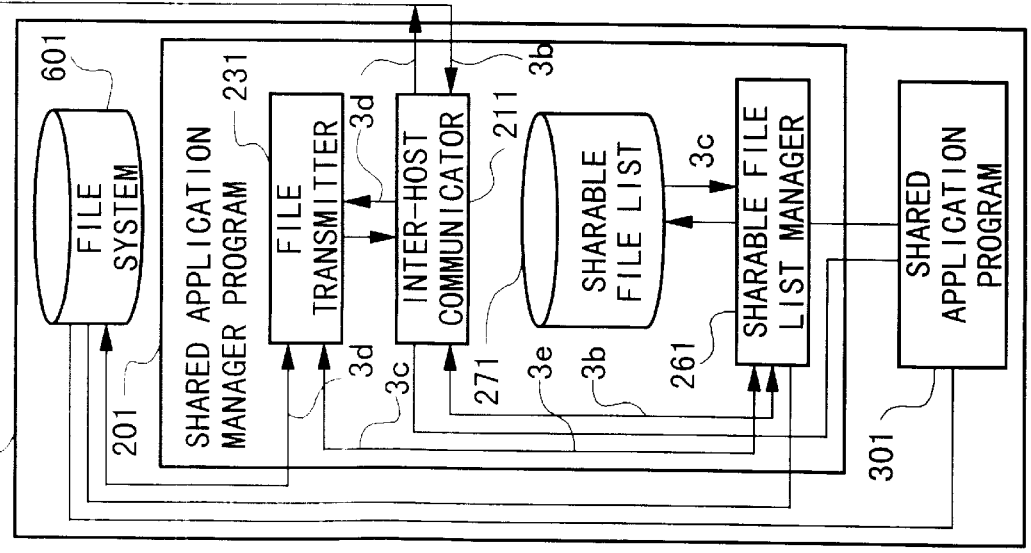
FIG.6

COOPERATIVE WORK SUPPORT SYSTEM

FIELD OF THE INVENTION

The present invention relates to a cooperative work support system and a computer readable medium which provides a responsive cooperative work environment for work such as presentations and cooperative writing.

This application is based on Japanese Patent Application No. Hei 10-31063, the contents of which are incorporated herein by reference.

BACKGROUND ART

As computer networks have progressed in recent years, a concept of CSCW (Computer Supported Cooperative Work), which facilitates multi-user cooperative work using computers networked together has been developed. The CSCW is realized by a cooperative work support system, which allows users to work together through the computer network.

FIG. 10 is a block diagram showing the structure of the cooperative work support system of the background art.

Files shared by terminals 21 to 23 are stored in a file system 421 of a server 20. To access the shared file according to shared application programs 721 to 723, a request for permission is sent to other terminals using inter-host communicators 711 to 713, and information of the file to be accessed is sent to shared file provider 411 in the server 20 through lines 511 to 513.

On receipt of the information, the shared file provider 411 reads the shared file from the file system 421, and sends it through lines 511 to 513 to the shared application programs 721 to 723 in the terminals 21 to 23. Thus, the file stored in the file system 421 can be shared by and utilized in all of the shared application programs 721 to 723.

However, since the main storage area available to the shared application programs 721 to 723 is limited, when a user refers to data portions in references during the cooperative work, the data portions of the file must be re-read from the file system 421 using the shared file provider 411 in the server 20.

When the transmission rate of the lines 511 to 513 is low or congestion occurs with transactions from the terminals 21 to 23, responses of data requested by the shared application programs 721 to 723 may be delayed. Therefore, the multi-user cooperative work from the terminals 21 to 23 is often interrupted and responsive cooperative work cannot be achieved.

SUMMARY OF THE INVENTION

It is therefore an object of the present invention to provide a cooperative work support system and a computer readable medium which provide a responsive cooperative work environment for work such as presentations and cooperative writing.

In order to accomplish the above object, the cooperative work support system of the present invention has a plurality of terminals in a communication network, wherein each terminal comprises: a cooperative work execution means for providing cooperative work by the terminals by sending and receiving data between the terminals through the communication network; a specification means for specifying a file in the terminal as a shared file to be used in the cooperative work between the terminals; a shared file storage means for storing the shared file specified by the specification means; a shared file information transmission means for transmitting information of the shared file to the other terminal through the communication network; a shared file information storage means for storing the information of the shared file; a determination means for determining whether the shared file specified by the cooperative work execution means exists within the terminal, based on the information of the shared file stored in the shared file information storage means; a transmission request means for creating and sending a transmission request to request transmission of the shared file when it is determined by the determination means that the shared file does not exist within the terminal; a transmission means for transmitting the shared file to the shared file storage means in the terminal which is the sender of the transmission request in response to the transmission request; and an update means for updating the information of the shared file in the shared file information storage means when the shared file is transmitted from the terminal.

In the cooperative work support system of the present invention, when it is determined that the shared file exists within the terminal, the cooperative work execution means uses the shared file stored in the shared file storage means, when it is determined that the shared file does not exist within the terminal, the shared file being transmitted by the transmission means from the other terminal to the shared file storage means, the information of the shared file being updated by the update means, and the cooperative work execution means using the shared file stored in the shared file storage means.

The terminals in the cooperative work support system have shared file storage means for storing the shared file. Even when the shared file exists in the other terminal, the shared file is transmitted, so that the cooperative work execution means can utilize the shared file within the terminal. Therefore, the cooperative work support system of the embodiment prevents delays in response to access to a shared file and provides a responsive cooperative work environment without interruption.

In the cooperative work support system of the present invention, the transmission means obtains the storage position of the shared file in the shared file storage means from the information stored in the shared file information means, the transmission means transmitting the shared file according to the obtained storage position.

In the cooperative work support system of the present invention, the shared file information transmission means transmits the position in the shared file storage means as the information of the shared file specified by the specification means, the shared file information storage means stores the storage position in the other terminal transmitted from the shared file information transmission means of the other terminal, the transmission request means transmits the storage position in the other terminal with the transmission request, and the transmission means transmits the shared file according to the storage position transmitted from the transmission request means.

In the cooperative work support system of the present invention, the shared file storage means stores the storage position of the shared file specified by the specification means, and the transmission means transmits the requested shared file according to the storage position of the shared file in the shared file storage means.

In the cooperative work support system of the present invention, the information stored in the shared file information storage means includes a sharing time of the shared file, and each terminal comprises: a time determination means for determining the sharing time of each shared file stored in the shared file information storage means after the cooperative work execution means terminates a process; an information determination means for determining the other information of the shared file when it is determined that the sharing time of the shared file is temporary; a first deleting means for deleting the information of the shared file from the shared file information storage means when the information determination means determines that the other information indicates a predetermined first value; and a second deleting means for deleting the information of the shared file from the shared file information storage means and for deleting the shared file from the shared file storage means when the information determination means determines that the other information indicates a predetermined second value.

The terminals in the cooperative work support system have shared file storage means for storing the shared file. Even when the shared file exists in the other terminals, the shared file is transmitted, so that the cooperative work execution means can utilize the shared file within the terminal. Therefore, the cooperative work support system of the embodiment prevents delays in response to access to a shared file and provides a responsive cooperative work without interruption.

A computer readable medium of the present invention contains program instructions for managing a groupware application for specifying a file to be used in a plurality of terminals in a communication network as a shared file, the program instructions including instructions for performing the steps comprising: storing the shared file specified by the groupware application; registering predetermined information of the shared file specified by the groupware application into a list; transmitting the information of the shared file specified by the groupware application through the communication network; adding the transmitted information of the shared file transmitted in the list; determining whether the shared file specified in execution of the groupware application exists within the terminal, based on the information of the shared file stored in the list; transmitting a transmission request to request transmission of the shared file to the terminal which is indicated by the information of the shared file in the list when the shared file specified in execution of the groupware application does not exist within the terminal; transmitting the shared file specified by the transmission request to the terminal which is the sender of the transmission request; and updating the information of the shared file in the list when receiving the shared file.

In another aspect of the present invention, a cooperative work support system has at least a first terminal and a second terminal in a communication network, wherein each terminal comprises: a file system for storing a shared file; a file transmitter for transmitting the shared file between the first terminal and the second terminal; and a sharable file list manager for registering shared file information into a sharable file list.

The sharable file list manager in the second terminal determines whether the shared file exists within the second terminal based on the shared file information, and sends a transmission request to request the first terminal to transmit the shared file to the second terminal when the shared file does not exist within the second terminal, the file transmitter in the first terminal sends the shared file from the first terminal to the second terminal through the communication network in response to the transmission request, and the sharable file list manager in the second terminal updates the shared file information in the sharable file list in the second terminal after the transmission of the shared file.

The sharable file list manager deletes the shared file information according the shared file information after use of the shared file. Further, the sharable file list manager deletes the shared file according the shared file information after use of the shared file.

The sharable file list manager in the first terminal sends an addition request to request the second terminal to add the shared file information to the sharable file list, with position information which indicates the position of the shared file in the first terminal, the sharable file list manager in the second terminal sends the transmission request to the first terminal with the position information, and the sharable file list manager in the first terminal sends the shared file from the first terminal according to the position information from the second terminal. The first terminal may read the shared file in response to the transmission request using a link in the file system in the first terminal.

In another aspect of the present invention, a computer readable medium contains program instructions for handling a shared file in a cooperative work support system which includes at least a first terminal and a second terminal in a communication network, the program instructions including instructions for performing the steps comprising: registering shared file information to sharable file lists in the first terminal and the second terminal; determining whether the shared file exists within the second terminal based on the shared file information; sending a transmission request to request the first terminal to transmit the shared file to the second terminal when the shared file does not exist within the second terminal; sending the shared file from the first terminal to the second terminal through the communication network in response to the transmission request; and updating the shared file information in the sharable file list in the second terminal after the transmission of the shared file.

After using the shared file, the program may delete the shared file information according to the shared file information, and may delete the shared file according to the shared file information.

The program instructions include instructions for: sending an addition request to request the second terminal to add the shared file information to the sharable file list, with position information which indicates the position of the shared file in the first terminal; sending the transmission request to the first terminal with the position information; and sending the shared file from the first terminal according to the position information from the second terminal. The first terminal reads the shared file from a file system in response to the transmission request using a link stored in the file system.

The information includes a transmission flag which indicates whether the shared file is transmitted to the second terminal, a provider terminal which indicates a provider of the shared file, the position of the shared file in the terminal, a sharing time of the shared file, and the information includes a shared file name.

The each terminal in the cooperative work support system has shared file storage means for storing the shared file. Even when the shared file exists in the other terminal, the shared file is transmitted, so that the cooperative work execution means can utilize the shared file within the terminal. Therefore, the cooperative work support system of the embodiment prevents delays in response to access to a shared file and provides a responsive cooperative work environment without interruption.

By adding the sharing time to the information of the shared file, a permanent shared file and the information thereof remain in the shared file storage means and in the shared file information storage means after completion of the cooperative work execution means. The unnecessary shared file and the information thereof are deleted after the completion of the cooperative work execution means, thereby increasing the storage capacity.

BRIEF DESCRIPTION OF THE DRAWINGS

FIG. 3 is a diagram showing an example of a sharable file list of the present invention.

FIG. 6 is a diagram showing a process for transmitting a shared file in the cooperative work support system of the first embodiment of the present invention.

DETAILED DESCRIPTION OF THE PREFERRED EMBODIMENTS

Figure 1:
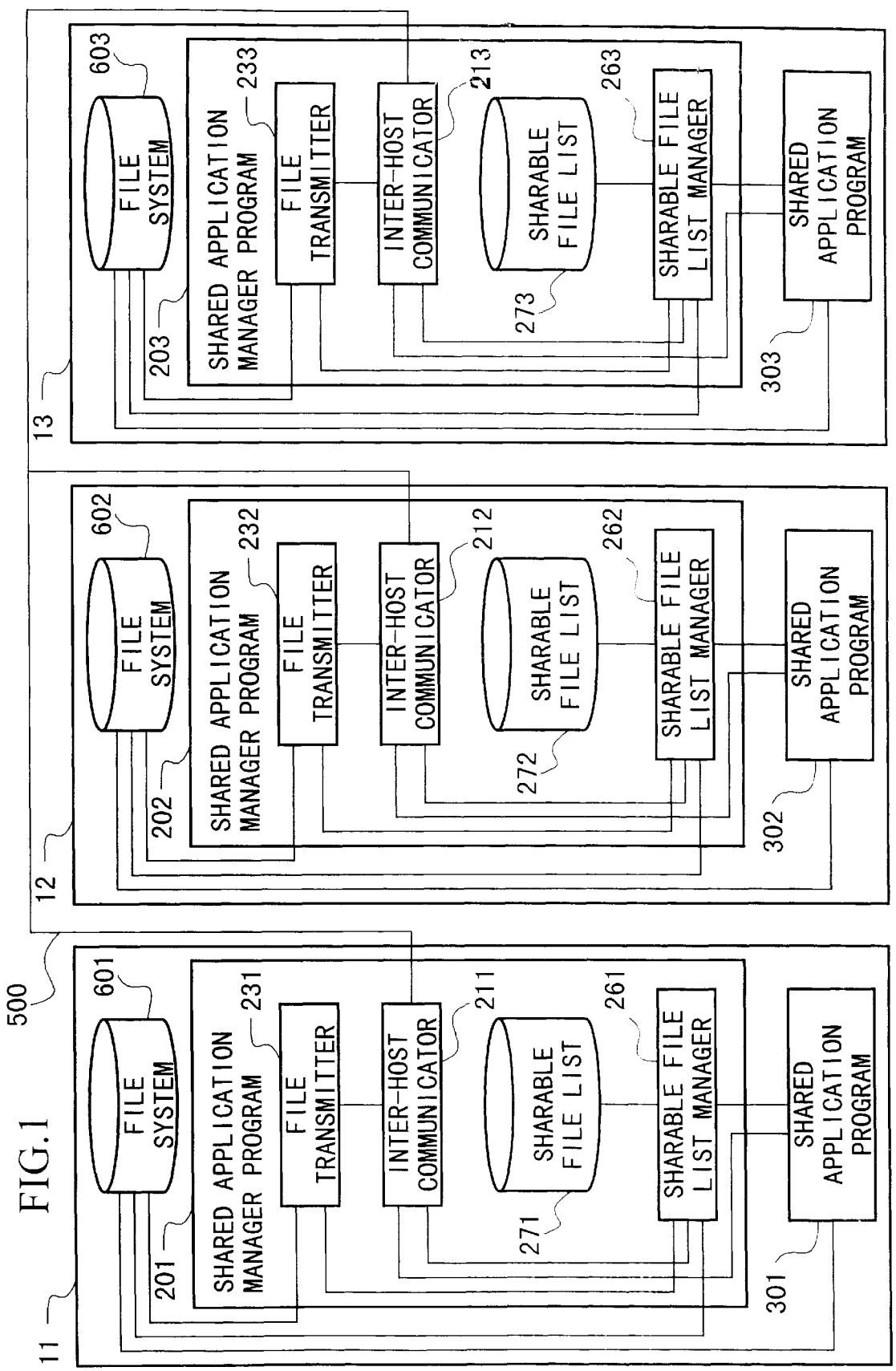
FIG. 1 is a block diagram showing the structure of a cooperative work support system of the first embodiment of the present invention.

The best mode of the cooperative work support system, according to an embodiment of the present invention, will be explained with reference to THE figures.
First Embodiment FIG. 1 is a block diagram showing a structure of a cooperative work support system of the first embodiment.

The cooperative work support system includes a plurality of terminals 11 to 13 connected to each other through a line 500.

The line 500 is a communication network such as an office LAN (Local Area Network) which enables data transmission between the terminals 11 to 13.

The terminals 11 to 13 are, for example, personal computers or workstations which include shared application management programs 201 to 203, shared application programs 301 to 303, and file systems 601 to 603. The shared application management programs 201 to 203 include inter-host communicators 211 to 213, file transmitters 231 to 233, and sharable file list managers 261 to 263, and sharable file lists 271 to 273.

Figure 2:
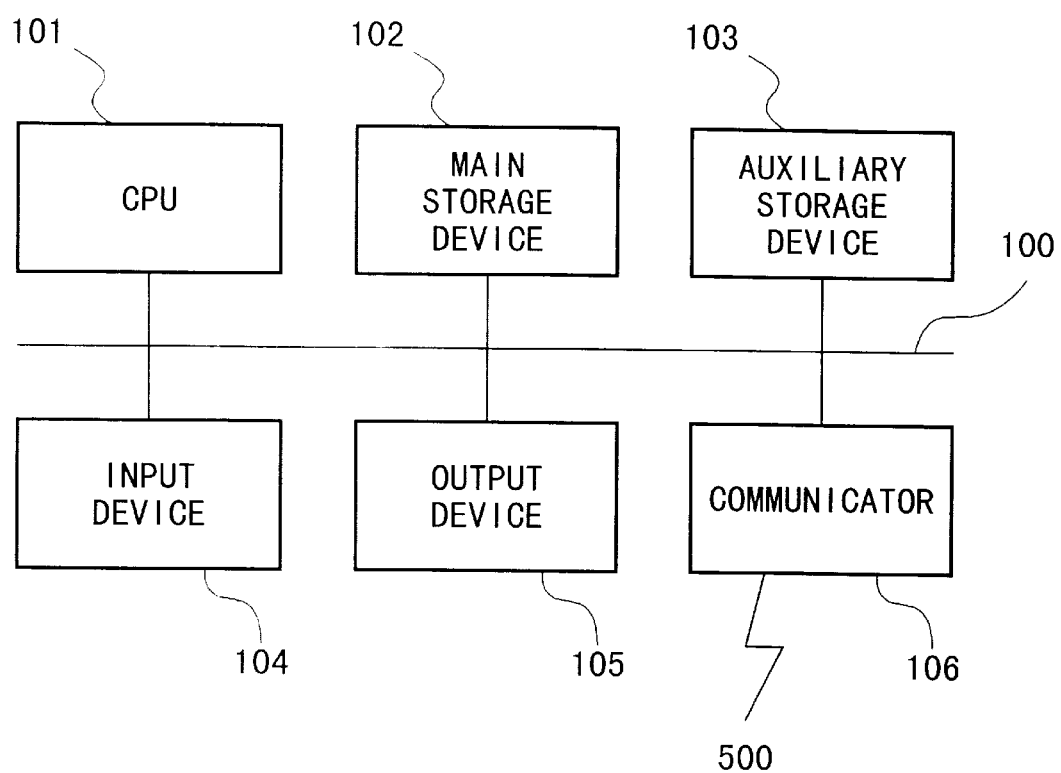
FIG. 2 is a block diagram showing the structure of a terminal of the present invention.

FIG. 2 is a block diagram showing one of the terminals 11 to 13, which includes a CPU 101, a main storage device 102, an auxiliary storage device 103, an input device 104, an output device 105, and a communicator 106.

The CPU (Central Processing Unit) 101 executes programs read to the main storage device 102 to operate the file transmitters 231 to 233, the sharable file list managers 261 to 263, and the shared application programs 301 to 303. The main storage device 102 provides a real address space which stores the program executed by the CPU 101 and is utilized as a work area when the CPU executes the program. The auxiliary storage device 103 provides a virtual address space to the CPU 101, which stores the shared application management programs 201 to 203, the shared application programs 301 to 303, the sharable file lists 271 to 273, and files in the file systems 601 to 603.

The input device 104 includes a keyboard and a mouse, which enable input of documents according to the shared application programs 301 to 303 and of instruction to the CPU 101. The output device 105 includes a display such as a CRT (Cathode Ray Tube), which indicates results of execution of the shared application programs 301 to 303. The communicator 106 includes an interface such as a LAN card, which operates with processing programs as the inter-host communicators 211 to 213.

Referring to FIG. 1, operations of the terminals 11 to 13 are explained in detail. The shared application programs 301 to 303, controlled by the shared application management programs 201 to 203, exchange information through the line 500, operating as a groupware which works cooperatively. The shared application programs 301 to 303 are, for example, presentation applications or collaborative document writing applications.

The file systems 601 to 603 store and manage the files available to the terminals 11 to 13, which include the sharable files provided in common to the shared application programs 301 to 303.

The shared application management programs 201 to 203 manage the shared application programs 301 to 303 and control addition, transmission, and utilization of sharable files. The sharable application programs 201 to 203 include the inter-host communicators 211 to 213, the file transmitters 231 to 233, the sharable file list managers 261 to 263, and the sharable file lists 271 to 273.

The inter-host communicators 211 to 213 control data transmission of the shared files to and from the shared application programs 201 to 203 in the terminals through the line 500 under control of the sharable file list managers 261 to 263. Within each terminal, the data transmission is performed between the processes using interprocess communication.

With the inter-host communicators 211 to 213, the file transmitters 231 to 233 transmit the files from the file systems 601 to 603 to the other terminal file systems 601 to 603, according to the process described below. The general meaning of file transmission is to copy the files in the file systems 601 to 603, which includes creation of files in the other terminal file systems 601 to 603.

The sharable file lists 271 to 273 contain information of files sharable by all shared application programs 301 to 303. According to instructions from the shared application programs 301 to 303, the sharable file list managers 261 to 263 manages the sharable file lists 271 to 273 to perform addition, transmission, initiation of utilization, and postprocesses.

FIG. 3 shows an example of the information stored in the sharable file lists 271 to 273. The information includes "shared file name", "provider terminal", "transmission flag", "position in file system", and "sharing time".

The "shared file name" is used for designation of the shared file by the shared application programs 301 to 303, and is defined in common over the entire system by the sharable file list managers 261 to 263 according to a combination of an original file name, a file time stamp, a file size, and a terminal name providing the file. The "provider terminal" represents which terminals 11 to 13 provide the shared file by, for example, a terminal name. When the provider terminal corresponds to the terminal which includes the sharable file list, "provider terminal" is set to "(local)", which indicates that the sharable file is provided from the local terminal.

The "transmission flag" represents whether the shared file is transmitted from the provider terminal file system 601 to 603 to the other file systems 601 to 603. "Transmission flag" is set to 1 when the shared file has already been transmitted, and is set to zero when the shared file has not transmitted. When the provider terminal corresponds to the terminal which includes the sharable file list, the "transmission flag" is necessarily set to 1.

The "position in file system" represents location of the sharable file corresponding the "sharable file name". When the sharable file has already been transmitted and is stored in the file system 601 to 603 in the terminals with the sharable file lists 271 to 273, a position in the file systems 601 to 603 is indicated. When the sharable file has not been transmitted, a position in the provider terminal file systems 601 to 603 is indicated.

The "sharing time" represents a time to hold the sharable file added to the sharable file lists 271 to 273 and to hold the file transmitted to the file systems 601 to 603 from the other terminals, and is set to one of "permanent" and "temporary". When it is "permanent", the corresponding information and sharable file are held in the sharable file lists 271 to 273 and in the file systems 601 to 603 after the shared application programs 301 to 303 are completed. When it is, on the other hands, "temporary", the corresponding information and sharable file are deleted from the sharable file lists 271 to 273 after the shared application programs 301 to 303 are completed.

A process of the cooperative work support system of the embodiment will be explained by way of an example in which a file in the file system 601 in the terminal 11 is used as a shared file through the shared application programs 201 to 203 from all the terminals 11 to 13.

In response to a specified event, the shared application program 301 creates a share request to share the file in the file system 601, which contains information such as a storing position in the file system 601 and a sharing time, and sends the share request to the sharable file list manager 261.

On receipt of the share request, the sharable file list manager 261 adds the information of the file to be shared to the sharable file lists 271 to 273. Thus, the information of the file is added as a shared file to the sharable file lists 172 to 273.

The shared application program 301, in response to a specified event, creates a use request to use the shared file whose information is registered in the shared file lists 271 to 273, and sends the use request to the sharable file list manager 261.

On receipt of the use request, the sharable file list manager 261 notifies the shared application program 301 of the start of the use of the shared file and of the position of the shared file in the file system 601.

When the shared application programs 302 and 303 send use requests to the sharable file list managers 262 and 263, the sharable file list managers 262 and 263 transmit the sharable file from the file system 601 to the file systems 602 and 603 through the transmission process described below, and notify the shared application programs 302 and 303 of the start of the use of the shared file and of the position of the shared file in the file system 601.

The shared application programs 301 to 303, in response to a specified event, send termination requests to terminate the processes by the shared application programs 301 to 303 to the sharable file list managers 261 to 263.

On receipt of the termination requests, the sharable file list managers 261 to 263 perform post processes for the sharable file lists 271 to 273 and the files in the file systems 601 to 603 registered in the lists, and notify the shared application programs 301 to 303 of the termination of the processes.

The above-described process consists of:
1) addition of the shared file to the sharable file list,
2) starting the use of the shared file in the sharable file list,
3) transmission of the shared file in the sharable file list, and
4) post processing for the shared file after the shared application program terminates, which will be explained below in more detail.

1) Addition of the Shared File to the Sharable File List

Figure 4:
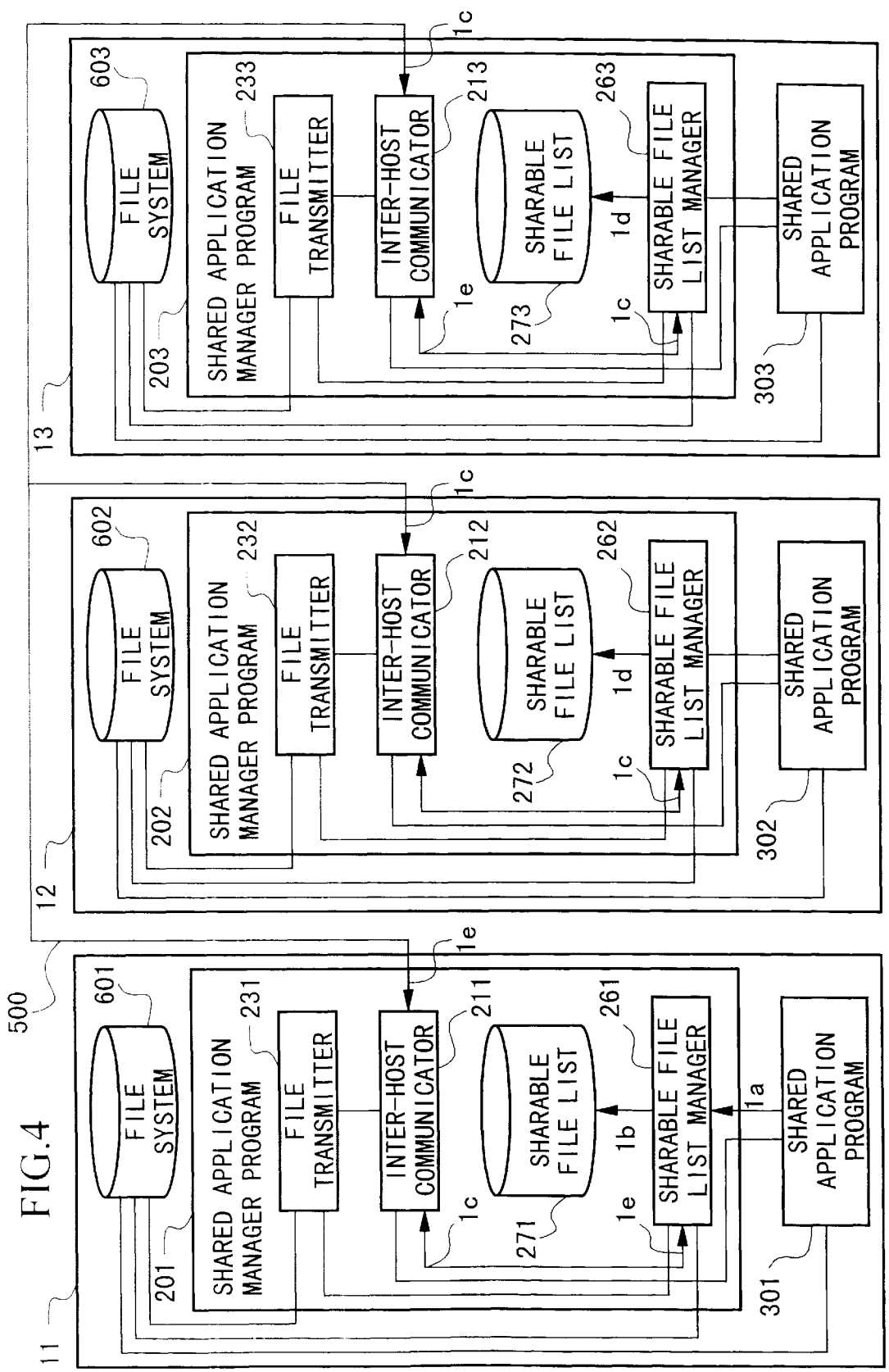
FIG. 4 is a diagram showing a process for adding a shared file to the sharable file list in the cooperative work support system of the first embodiment of the present invention.

FIG. 4 shows the process for adding the shared file to the sharable file lists 271 to 273. While the process is described in an example in which a file stored in the file system 601 of the terminal 11 is added as a shared file, a similar process is performed when shared files provided from the other terminals 12 and 13 are added.

During execution of the shared application program 301, a user inputs a specified operation through the input device 14 according to a dialogue box indicated by the output device 15 in order to specify use of the file in the file system 601 as a shared file.

According to the specification, the shared application program 301 sends an addition request to specify addition of the shared file together with information for addition of a file name to the sharable file list manager 261 (as shown by 1a).

On receipt of the addition request, the sharable file list manager 261 determines a shared file name of the specified file, and registers "(local)" as the provider terminal, 1 as the transmission flag, a specified value as the position in the file system, and a specified value as the sharing time in the sharable file list 271 (as shown by 1b).

The sharable file list manager 261 transmits the addition request with the determined shared file name and the sharing time through the inter-host communicator 211, the line 500, and the inter-host communicators 212 and 213 to the sharable file list managers 262 and 263 of the terminals 12 and 13 (as shown by 1c).

The sharable file list managers 262 and 263 register the transmitted file name as the shared file name, the name of the terminal 11 as the provider terminal, 0 as the transmission flag, the position in the file system left blank, and the transmitted value as the sharing time in the sharable file lists 272 and 273 (as shown by 1d).

After completion of the registration of the information of the shared file added to the sharable file lists 272 and 273, the sharable file list managers 262 and 263 notify the sharable file list manager 261 in the terminal 11 using the inter-host communicators 212 and 213, the line 500, and the inter-host communicator 211 (as shown by 1e).

2) Starting the Use of the Shared File in the Sharable File List

Figure 5:
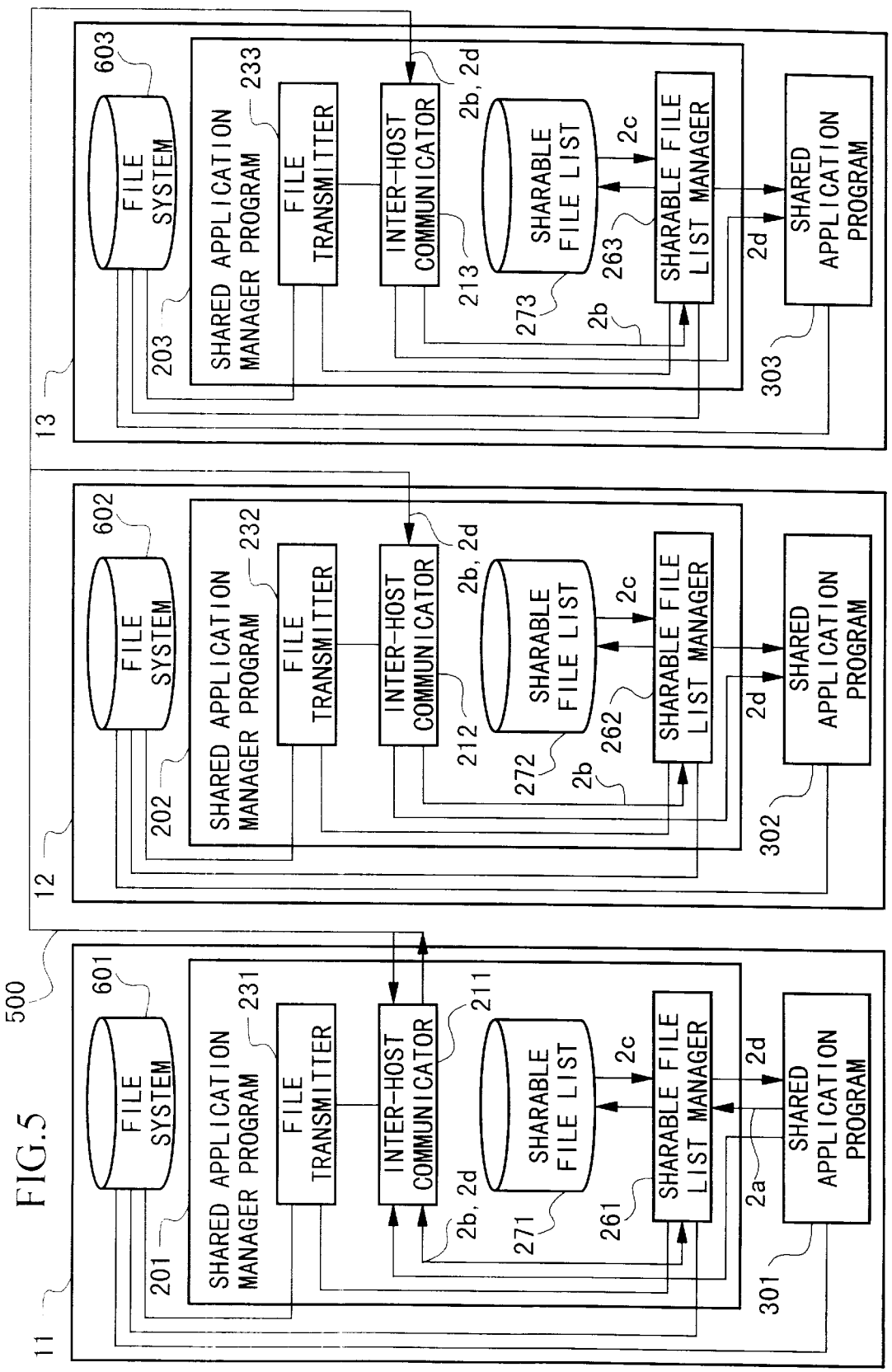
FIG. 5 is a diagram showing a process for starting use of a shared file in the sharable file list in the cooperative work support system of the first embodiment of the present invention.

FIG. 5 shows a process of starting use of the shared file in the sharable file lists 271 to 273.

While in the example the application program 301 utilizes the shared file, the similar process is performed when the other application programs 302 and 303 of the terminals 12 and 13 utilize the shared file.

During execution of the shared application program 301, a user inputs a specified operation through the input device 14 according to a dialogue box indicated by the output device 15 to specify use of the shared file registered in the sharable file list 271.

According to the specification, the shared application program 301 notifies the sharable file list manager 261 of a use request to specify use of the shared file together with information used for the specification of use, for example, the shared file name (as shown by 2a).

The sharable file list manager 261 transmits the use request to the sharable file list managers 262 and 263 using the inter-host communicator 211, the line 500, and the inter-host communicators 212 and 213 (as shown by 2b).

The sharable file list managers 261 to 263 perform retrieval in the sharable file list, read the transmission flag corresponding to the shared file name specified in the use request, and determine whether the transmission flag is set to 1 or 0 (as shown by 2c).

When the transmission flag is 1 (that is, the process is performed by the sharable file list manager 261), the shared file specified by the shared file name has been registered in the file system 601 in the terminal 11. The sharable file list manager 261 notifies the application program 301 of the start of the use of the shared file with information of the position in the file system which is read from the sharable file list 271.

When the transmission flag is, on the other hand, 0 (that is, the process is performed by the sharable file list managers 262 and 263), the shared file name is not registered in the file systems 602 and 603 in the terminals 12 and 13. The sharable file list managers 262 and 263 transmit the shared file to the file systems 602 and 603 according to the process described below, and update the sharable file lists 272 and 273. The sharable file list mangers 262 and 263 notify the application programs 302 and 303 of the start of the use of the shared file with information of the position in the file system which is read from the sharable file lists 272 and 273.

3) Transmission of the Shared File in the Sharable File List

FIG. 5 shows a process for transmitting the shared file in the sharable file lists 271 to 273 by way of an example, in which the shared file is transmitted to the file system 602 in the terminal 12, while the file may be transmitted to the file system 603 in the terminal 13 in a similar fashion.

The sharable file list manager 262 refers to the sharable file list 272 and is informed that the provider terminal of the specified shared file is terminal 11 (as shown by 3a).

The sharable file list manager 262 creates a transmission request for the file having the shared file name, and sends the request to the sharable file list manager 261 through the inter-host communicator 212, the line 500, and the inter-host communicator 211.

On receipt of the transmission request, the sharable file list manager 261 performs retrieval in the sharable file list 271, and obtains the position in the file system 601 of the shared file name which is added to the received transmission request. The sharable file list manager 261 transmits the transmission request from the terminal 12 with the position information to the file transmitter 231 (as shown by 3c).

The file transmitter 231 reads the shared file from the file system 601 based on the position information transmitted with the transmission request, and transmits the shared file to the file transmitter 232 through the inter-host communicator 211, the line 500, and the inter-host communicator 212. The file transmitter 232 registers the shared file into the file system 602, at which point the transmission of the shared file from file system 601 to the file system 602 is completed.

After completion of the file transmission, the file transmitter 232 notifies the sharable file list manager 261 of the completion of the file transmission and notifies the sharable file list manager 262 of the position in the file system 602 in which the shared file is registered (as shown by 3e).

The sharable file list manager 262 sets the transmission flag corresponding to the shared file in the sharable file list 272 to 1, and updates the position in the file system according to the notification from the file transmitter 232.

4) Process After the Shared Application Program Terminates

During execution of the shared application programs 301 to 303, a user instructs the shared application programs 301 to 303 to close by operation of the input device 14 according to a dialogue box indicated by the output device 15.

According to the instruction, the shared application programs 301 to 303 transmits a termination request to the sharable file list managers 261 to 263. Post processes performed by the sharable file list managers 261 to 263 which receive the termination request will be explained with reference to the flow chart of FIG. 7.

The sharable file list managers 261 to 263 repeat a loop for handling all the shared files registered in the sharable file lists 271 to 272 (in steps S10 to S10').

In the loop (step S10 to S10'), the sharable file list managers 261 to 263 read information of the target shared file from the sharable file lists 271 to 273 (in step S11).

The sharable file list managers 261 to 263 determine whether the sharing time in the information read in step S11 is permanent or temporary (in step S12).

When the sharing time is permanent in step S12, the sharable file list managers 261 to 263 perform no post process for the shared file, and go into the loop (steps S10 to S10') for handling the next shared file.

When the sharing time is temporary, the sharable file list managers 261 to 263 determine whether the provides terminal in the information read in step S11 is "(local)" (in step S13).

When the provider terminal is "(local)" in step S13, the sharable file list managers 261 to 263 delete information of the shared file from sharable file lists 271 to 273 (in step S14). Then, the sharable file list managers 261 to 263 go into the loop (steps S10 to S10') for handling the next shared file.

When the provider terminal is not "(local)" in step S13, the sharable file list managers 261 to 263 determine whether the transmission flag in the information read in step S11 is 0 or 1.

When the transmission flag is 0 in step S15, the sharable file list managers 261 to 263 delete information of the shared file from sharable file lists 271 to 273 (in step S16). Then, the sharable file list managers 261 to 263 go into the loop (steps S10 to S10') for handling the next shared file.

When the transmission flag is 1 in step S15, the sharable file list managers 261 to 263 delete the shared file in the file systems 601 to 603 according to the position in the file system included in the information read in step S11 (in step S17). The sharable file list managers 261 to 263 delete information of the shared file from sharable file lists 271 to 273 (in step S18). Then, the sharable file list managers 261 to 263 go into the loop (steps S10 to S10') for handling the next shared file.

It is determined that the sharable file list managers 261 to 263 completes processes for all the shared files, at which point the flow is completed.

In the cooperative work support system, a cooperative work process using the cooperative application programs 301 to 303 will be explained.

For example, when the application program 301 in the terminal 11 accesses the shared file stored in the file system 601, the application program 301 transmits the shared file name to the shared application programs 302 and 303 through the inter-host communicator 211, the line 500, and the inter-host communicators 212 and 213.

When a user makes a specified input operation through the input device 14 according to the execution of the shared application program 301, the application program 301 transmits the input information to the shared application programs 302 and 303 through the inter-host communicator 211, the lint 500, and the inter-host communicators 212 and 213.

Thus, the information of the file to which the shared application program 301 refers and of the input operation through the shared application program 301 can be provided to the other shared application programs 302 and 303 in the terminals 12 and 13. This allows the application programs 301 to 303 to provide a continuous cooperative work process environment.

When accesses to the shared file in the shared application programs 301 to 303 are needed, the programs have only to access the file systems 601 to 603 within the terminals, respectively. This eliminates the effects of congestion of transactions and of variable transmission rates, preventing delays in the transmission of a data portion in the shared file needed by the shared application programs 301 to 303 and interruption of the cooperative work by users from the terminals 11 to 13.

The cooperative work support system of the embodiment provides a responsive cooperative work environment in the shared application programs 301 to 303 without interruption.

When the shared file is used permanently, the sharing time is set to "permanent", which eliminates re-transmission of the shared file after the shared application programs 301 to 303 terminate and restart.

Second Embodiment

The cooperative work support system of the second embodiment includes processes different from the first embodiment:

(1') addition of the shared file to the sharable file list, and (3') transmission of the shared file in the sharable file list, which will be explained below in more detail.

(1') Addition of the Shared File to the Sharable File List

The process for adding the shared file to the sharable file lists 271 to 273 has steps different from 1c and 1d in the first embodiment shown in FIG. 4. The steps different from 1c and 1d will be explained with reference to FIG. 4.

After registration in the sharable file list 271 (as shown by 1b), the sharable file list managers 261 transmits the position in the file system 601, the specified shared file name, and the specified sharing time together with the addition request to the sharable file list managers 262 and 263 through the inter-host communicator 211, the line 500, and the inter-host communicators 212 and 213 (as shown by 1c).

The sharable file list managers 262 and 263 register the specified file name as the shared file name, the terminal 11 as the provider terminal, 0 as the transmission flag, a specified position in the file system 601 as the position in the file system, and a specified value as the sharing time in the sharable file lists 272 and 273 (as shown by 1b).

(3') Transmission of the Shared File in the Sharable File List,

The sharable file list manager 262 refers to the sharable file list 272 and obtains information that the provider terminal of the specified shared file is terminal 11 and the position in the file system 601 of the specified shared file (as shown by 4a).

The sharable file list manager 262 creates a file transmission request which includes the sharing file name and the position in the file system 601, and sends it to the file transmitter 231 via the inter-host communicator 212, the line 500, and the inter-host communicator 211 (as shown by 4b).

The file transmitter 231 reads the shared file from the file system 601 according to the position transmitted with the transmission request, and transmits the shared file to the file transmitter 232 through the inter-host communicator 211, the line 500, and the inter-host communicator 212. The file transmitter 232 registers the received shared file in the file system 602, at which point the transmission of the shared file from the file system 601 to the file system 602 is completed (as shown by 4c).

After the transmission of the file, the file transmitter 232 notifies the file transmitter 231 of the completion of the file transmission, and notifies the sharable file list manager 262 of the position in the file system 602 (as shown by 4d).

The sharable file list manager 262 sets the transmission flag corresponding to the shared file in the sharable file list 272 to 1, and updates the position in the file system to the position specified by the file transmitter 232.

In the cooperative work support system of the second embodiment, the file transmitters 231 to 233 obtain the position of the shared file to be transmitted, thus eliminating retrieval in the sharable file lists 271 to 273 by the sharable file list managers 261 to 263 when transmitting the shared file. The cooperative work support system improves the response time to transmit the requested shared file, as compared with the first embodiment.

Third Embodiment

The cooperative work support system of the third embodiment performs an operation in a similar fashion to the first embodiment shown in FIG. 1 to FIG. 3.

The third embodiment differs from the first embodiment in that the cooperative work support system has a step of preparation for the shared file before of the use of the shared file, and is different from the second embodiment in the timing of file transmission. That is, the cooperative work support system of the third embodiment differs from the first and second embodiments in the addition of the shared file to the sharable file lists 271 to 273 and in the transmission of the shared file.

In the cooperative work support system of the third embodiment, the steps (1") addition of the shared file to the sharable file list, and (3") transmission of the shared file in the sharable file list differ from those in the first and second embodiment and will be explained in more detail.

(1") Addition of the Shared File to the Sharable file List

Figure 9:
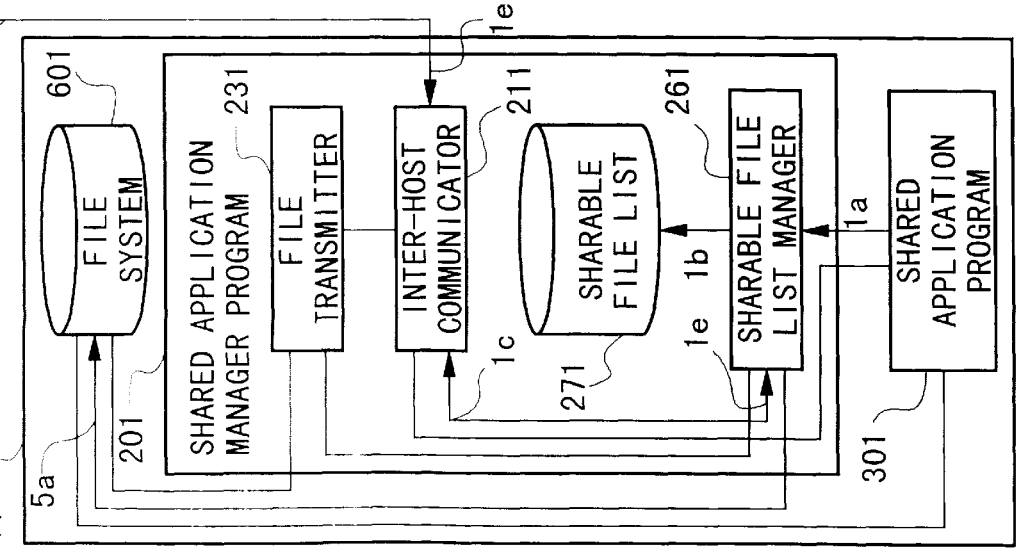
FIG. 9 is a diagram showing a process for adding a shared file to the sharable file list in the cooperative work support system of a third embodiment of the present invention.
Figure 10:
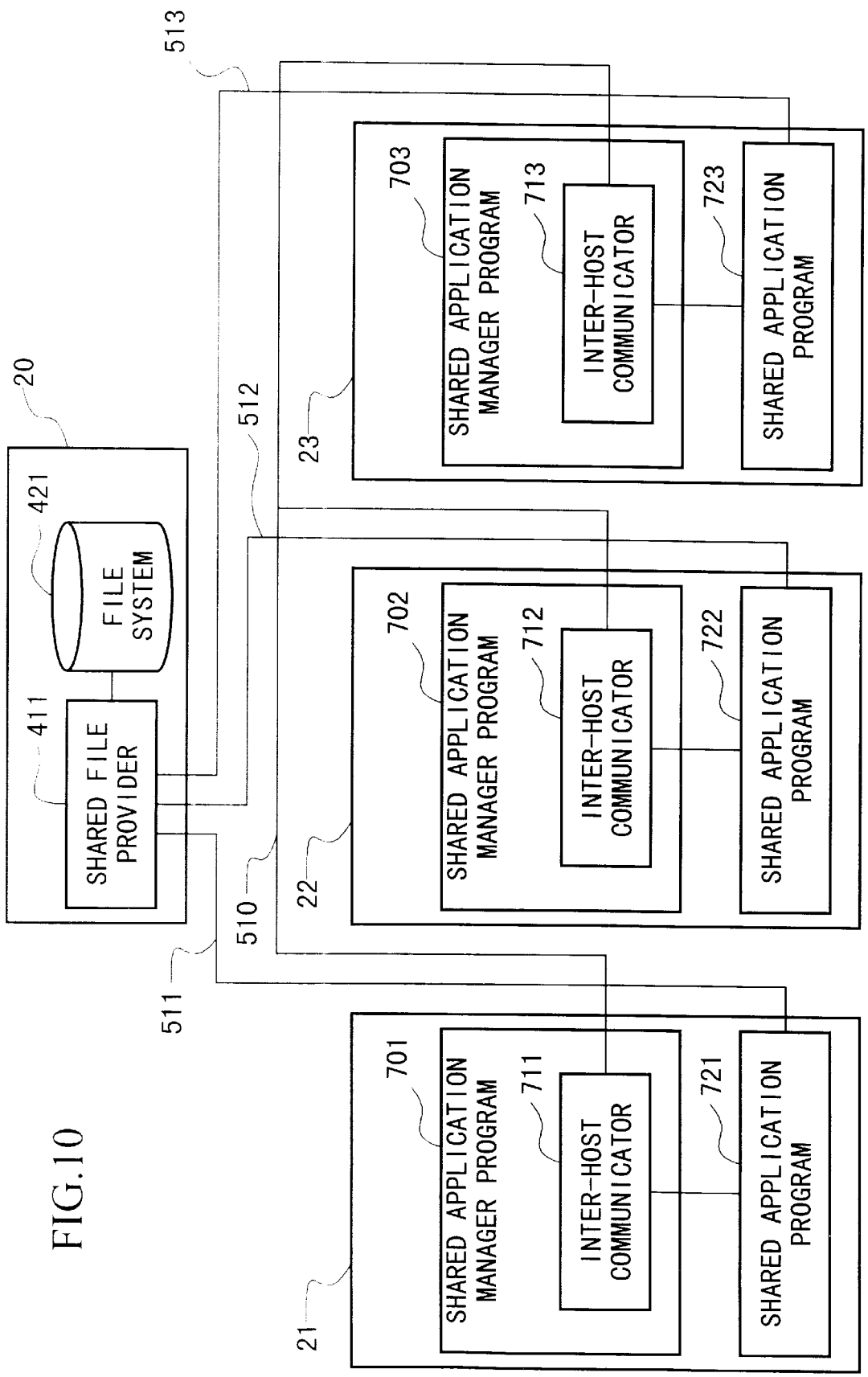
FIG. 10 is a block diagram showing a structure of a cooperative work support system of the background art.

The process for adding the shared file to the sharable file lists 271 to 273 further includes a process 5a as shown in FIG. 9.

In the process 5a, the sharable file list manager 261 creates an exclusive directory in the file system 601, which includes a link from the shared file name to the target file (a file specified as the shared file).

(3") Transmission of the Shared file in the Sharable File list

Figure 7:
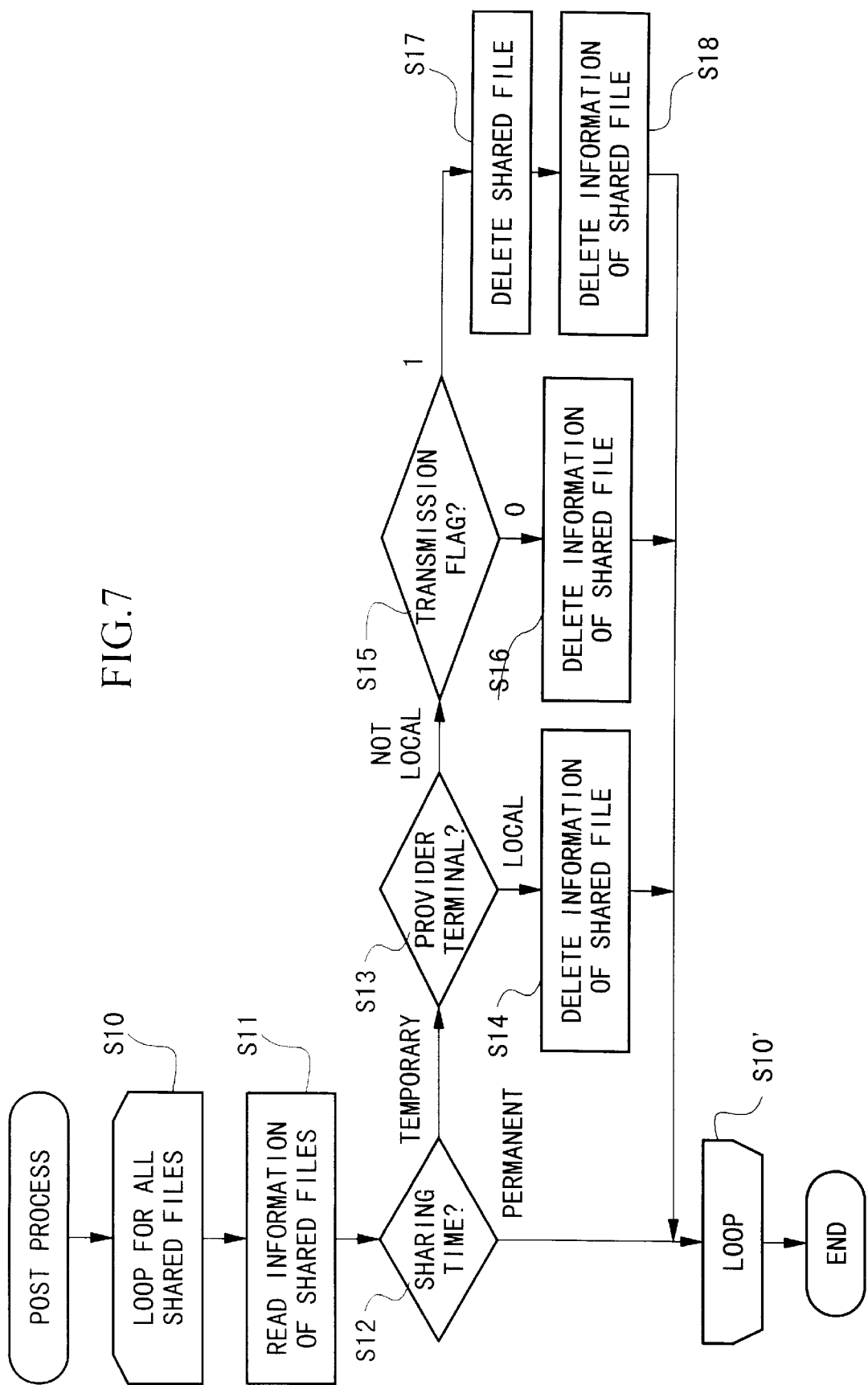
FIG. 7 is a diagram showing a post process performed by a sharable file list manager in the cooperative work support system of the first embodiment of the present invention.
Figure 8:
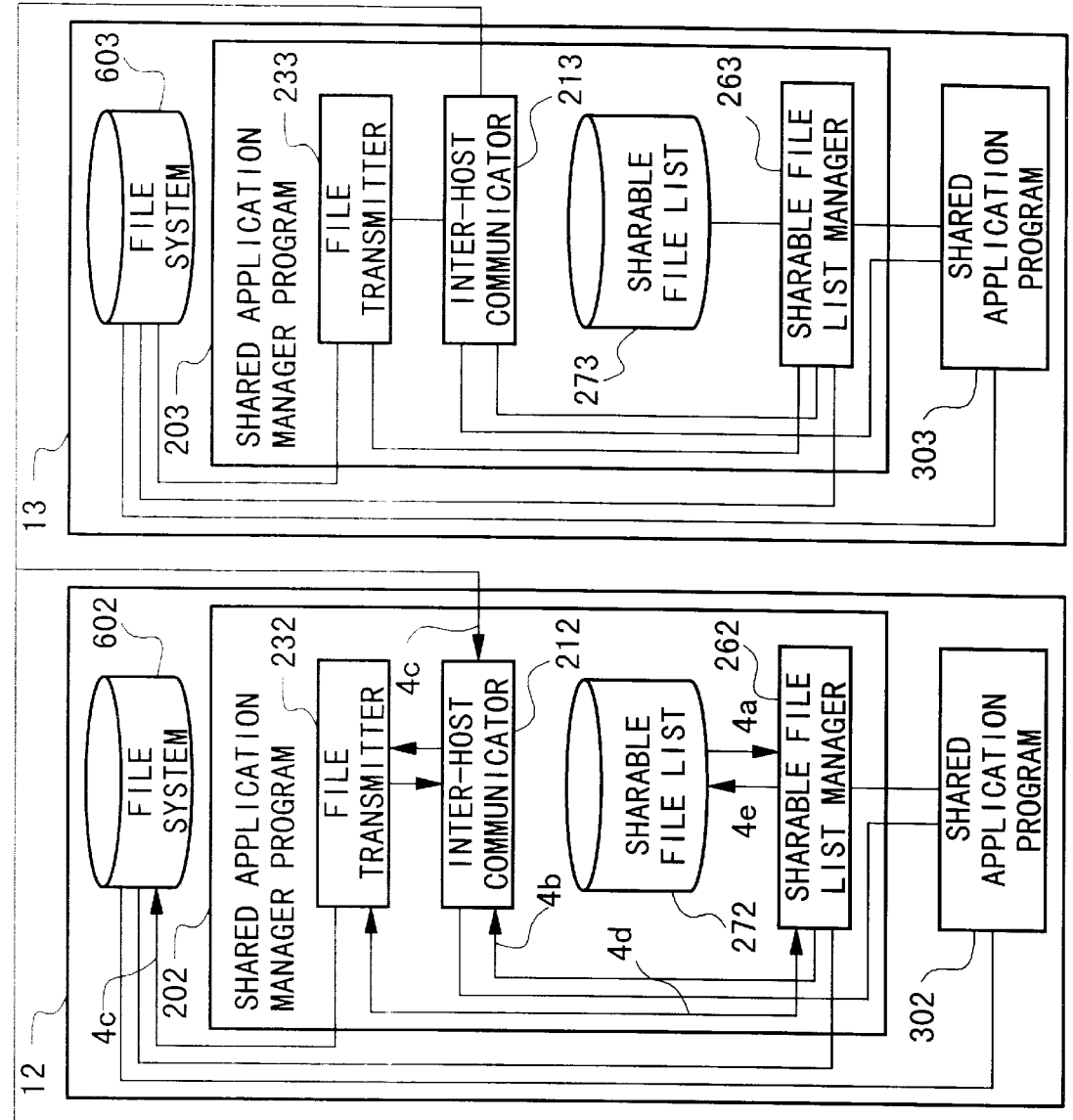
FIG. 8 is a diagram showing a process for transmitting a shared file in the cooperative work support system of a second embodiment of the present invention.

A process for transmitting the shared file in the sharable file lists 271 to 273 differs from the second embodiment in FIG. 7 in the processes 4b and 4c. The processes different from 4b and 4c will be explained with reference to FIG. 4.

The sharable file list manager 262 creates a transmission request which includes the shared file name, and transmits it to the file transmitter 231 through the inter-host communicator 212, the line 500, and the inter-host communicator 211 (as shown by 4b).

The file transmitter 231 refers to the directory to obtain the file position of the shared file name transmitted with the transmission request. The file transmitter 231 reads the shared file from the file system 601 according to the position obtained from the directory, and transmits the shared file to the file transmitter 232 through the inter-host communicator 211, the line 500, and the inter-host communicator 212. The file transmitter 232 registers the received shared file in the file system 602, at which point the transmission of the shared file from the file system 601 to the file system 602 is completed (as shown by 4c).

In the cooperative work support system of the third embodiment, the file transmitters 231 to 233 obtains the position of the shared file to be transmitted, eliminating retrieval in the sharable file lists 271 to 273 by the sharable file list managers 261 to 263 when transmitting the shared file. The cooperative work support system improves the response time to transmit the requested shared file, as compared with the first embodiment.

Modified Embodiment

While in the first to third embodiments the shared application programs 301 to 303 transmit information to the sharable file list managers 261 to 263, specifying the position in the file system and the sharing time to be registered in the sharable file lists 271 to 273. When they are not specified, the sharable file list managers 261 to 263 may automatically set the position in the file system and may set the sharing time to a default value (for example, temporary). This allows the system to handle a request from a shared application of the background art specifying only the file name. For example, a system may include different versions of the shared applications in the terminals.

In the first to third embodiments, the information of the shared file is transmitted to the other sharable file list managers 261 to 263 through the line 500 when the shared file is specified by the application programs 301 to 303 in the terminals 11 to 13. Alternatively, when starting one of the terminals 11 to 13, the sharable file list managers 261 to 263 may request transmission of the sharable file list from the sharable file list managers in one of the terminals which has been already started. The sharable file list managers 261 to 263 in the starting terminal may set the transmission flag to 0 in the sharable file list. Thus, the terminal 13 can participate in the cooperative work performed by the terminals 11 and 12.

While the line 500 is a communication network such as an office LAN whose area is limited, the line 500 may be a wide area communication network such as the Internet. Although in the embodiments three terminals 11 to 13 are connected through the line 500, the present invention can be applied to a system which includes more than two terminals.

The programs (shared application programs 201 to 203) are stored in the auxiliary storage device 103, and are read into the main storage device 102. The programs may be stored in a computer readable medium such as a CD-ROM and a floppy disk.

The each terminal in the cooperative work support system has shared file storage means for storing the shared file. Even when the shared file exists in the other terminal, the shared file is transmitted, so that the cooperative work execution means can utilize the shared file within the terminal. Therefore, the cooperative work support system of the embodiment prevents delays in response to access to a shared file and provides a responsive cooperative work environment without interruption.

By adding the sharing time to the information of the shared file, the permanent shared file and the information thereof remain in the shared file storage means and in the shared file information storage means after completion of the cooperative work execution means. The unnecessary shared file and the information thereof are deleted after the completion of the cooperative work execution means, thereby increasing the storage capacity.

The cooperative work support system of the embodiment prevents delays in response to access to a shared file and provides a responsive cooperative work environment.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A cooperative work support system having a plurality of terminals in a communication network, wherein each terminal comprises:

a cooperative work execution means for providing cooperative work by said terminals by sending and receiving data between said terminals through said communication network;

a specification means for specifying a file in said terminal as a shared file to be used in the cooperative work between said terminals;

a shared file storage means for storing said shared file specified by said specification means;

a shared file information transmission means for transmitting information of said shared file to said other terminal through said communication network;

a shared file information storage means for storing the information of the shared file;

a determination means for determining whether the shared file specified by said cooperative work execution means exists within said terminal, based on the information of the shared file stored in said shared file information storage means;

a transmission request means for creating and sending a transmission request to request transmission of the shared file when it is determined by said determination means that the shared file does not exist within said terminal;

a transmission means for transmitting the shared file to said shared file storage means in said terminal which is the sender of the transmission request in response to the transmission request;

an update means for updating the information of the shared file in said shared file information storage means when the shared file is transmitted from said terminal; and wherein the information stored in said shared file information storage means includes a sharing time of the shared file, each terminal comprising:

a time determination means for determining the sharing time of the each shared file stored in said shared file information storage means after said cooperative work execution means terminates a process;

an information determination means for determining the other information of the shared file when it is determined that the sharing time of the shared file is temporary;

a first deleting means for deleting the information of the shared file from said shared file information storage means when said information determination means determines that the other information indicates a predetermined first value; and a second deleting means for deleting the information of the shared file from said shared file information storage means and for deleting the shared file from the shared file storage means when said information determination means determines that the other information indicates a predetermined second value.

2. A cooperative work support system according to claim 1, wherein when it is determined that the shared file exists within said terminal, said cooperative work execution means uses the shared file stored in said shared file storage means, when it is determined that the shared file does not exist within said terminal, the shared file is transmitted by said transmission means from said other terminal to said shared file storage means, the information of the shared file is updated by said update means, and said cooperative work execution means uses the shared file stored in said shared file storage means.

3. A cooperative work support system according to claim 1, wherein said transmission means obtains the storage position of the shared file in said shared file storage means from the information stored in said shared file information means, said transmission means transmitting the shared file according to the obtained storage position.

4. A cooperative work support system according to claim 1, wherein said shared file information transmission means transmits the position in said shared file storage means as the information of the shared file specified by said specification means, said shared file information storage means stores the storage position in said other terminal transmitted from said shared file information transmission means of said other terminal, said transmission request means transmits the storage position in said other terminal with the transmission request, and said transmission means transmits the shared file according to the storage position transmitted from said transmission request means.

5. A cooperative work support system according to claim 1, wherein said shared file storage means stores the storage position of the shared file specified by said specification means, and said transmission means transmits the requested shared file according to the storage position of the shared file in said shared file storage means.

6. A computer readable medium containing program instructions for managing a groupware application for specifying a file to be used in a plurality of terminals in a communication network as a shared file, the program instructions including instructions for performing the steps comprising:

storing the shared file specified by said groupware application;

registering predetermined information of the shared file specified by said groupware application into a list;

transmitting the information of the shared file specified by said groupware application through said communication network;

adding the transmitted information of the shared file transmitted in the list;

determining whether the shared file specified in execution of said groupware application exists within said terminal, based on the information of the shared file stored in the list;

transmitting a transmission request to request transmission of the shared file to said terminal which is indicated by the information of the shared file in the list when the shared file specified in execution of said groupware application does not exist within said terminal;

transmitting the shared file specified by the transmission request to the terminal which is the sender of the transmission request; and updating the information of the shared file in the list when receiving the shared file, wherein the information stored in said list includes a sharing time of the shared file, each terminal comprising:

a time determination means for determining the sharing time of the each shared file stored in said list after said groupware application terminates a process;

an information determination means for determining the other information of the shared file when it is determined that the sharing time of the shared file is temporary;

a first deleting means for deleting the information of the shared file from said list when said information determination means determines that the other information indicates a predetermined first value; and a second deleting means for deleting the information of the shared file from said list and for deleting the shared file from the shared file storage means when said information determination means determines that the other information indicates a predetermined second value.

7. A cooperative work support system having at least a first terminal and a second terminal in a communication network, wherein each terminal comprises:

a file system for storing a shared file;

a file transmitter for transmitting the shared file between said first terminal and said second terminal; and a sharable file list manager for registering shared file information into a sharable file list, wherein the sharable file list registered in said sharable file list manager includes a sharing time of the shared file, each terminal comprising:

a time determination means for determining the sharing time of the each shared file registered in said sharable file list manager after said file transmitter terminates a process;

an information determination means for determining the other information of the shared file when it is determined that the sharing time of the shared file is temporary;

a first deleting means for deleting the shared file information of the shared file from said sharable file list when said information determination means determines that the other information indicates a predetermined first value; and a second deleting means for deleting the shared file information of the shared file from said sharable file list and for deleting the shared file from the file system when said information determination means determines that the other information indicates a predetermined second value.

8. A cooperative work support system according to claim 7, wherein said sharable file list manager in said second terminal determines whether the shared file exists within said second terminal based on the shared file information, and sends a transmission request to request said first terminal to transmit the shared file to said second terminal when the shared file does not exist within said second terminal, said file transmitter in said first terminal sends the shared file from said first terminal to said second terminal through said communication network in response to the transmission request, and said sharable file list manager in said second terminal updates the shared file information in the sharable file list in said second terminal after the transmission of the shared file.

9. A cooperative work support system according to claim 7, wherein said sharable file list manager deletes the shared file information according the shared file information after use of the shared file.

10. A cooperative work support system according to claim 7, wherein said sharable file list manager deletes the shared file according the shared file information after use of the shared file.

11. A cooperative work support system according to claim 7, wherein said sharable file list manager in said first terminal sends an addition request to request said second terminal to add the shared file information to the sharable file list with position information which indicates the position of the shared file in said first terminal, said sharable file list manager in said second terminal sends the transmission request to said first terminal with the position information, and said sharable file list manager in said first terminal sends the shared file from said first terminal according to the position information from said second terminal.

12. A cooperative work support system according to claim 7, wherein said first terminal reads the shared file in response to the transmission request using a link in said file system in said first terminal.

13. A computer readable medium containing program instructions for handling a shared file in a cooperative work support system which includes at least a first terminal and a second terminal in a communication network, the program instructions including instructions for performing the steps comprising:

registering shared file information to sharable file lists in said first terminal and said second terminal;

determining whether the shared file exists within said second terminal based on the shared file information;

sending a transmission request to request said first terminal to transmit the shared file to said second terminal when the shared file does not exist within said second terminal;

sending the shared file from said first terminal to said second terminal through said communication network in response to the transmission request; and updating the shared file information in the sharable file list in said second terminal after the transmission of the shared file, wherein the information stored in said sharable file lists includes a sharing time of the shared file, each terminal comprising:

a time determination means for determining the sharing time of the each shared file stored in said sharable file lists after said cooperative work support system terminates a process;

an information determination means for determining the other information of the shared file when it is determined that the sharing time of the shared file is temporary;

a first deleting means for deleting the shared file information of the shared file from said sharable file lists when said information determination means determines that the other information indicates a predetermined first value; and a second deleting means for deleting the shared file information of the shared file from said sharable file lists and for deleting the shared file when said information determination means determines that the other information indicates a predetermined second value.

14. A computer readable medium according to claim 13, wherein said program instructions include instructions for:

after updating the shared file information, deleting the shared file information according to the shared file information.

15. A computer readable medium according to claim 13, wherein said program instructions include instructions for:

after updating the shared file information, deleting the shared file according to the shared file information.

16. A computer readable medium according to claim 13, wherein said program instructions include instructions for:

sending an addition request to request said second terminal to add the shared file information to the sharable file list, with position information which indicates the position of the shared file in said first terminal;

sending the transmission request to said first terminal with the position information; and sending the shared file from said first terminal according to the position information from said second terminal.

17. A computer readable medium according to claim 13, wherein said first terminal reads the shared file from a file system in response to the transmission request using a link stored in said file system.

18. A computer readable medium according to claim 13, wherein the information includes a transmission flag which indicates whether the shared file is transmitted to said second terminal.

19. A computer readable medium according to claim 13, wherein the information includes a provider terminal which indicates a provider of the shared file.

20. A computer readable medium according to claim 13, wherein the information includes the position of the shared file in said terminal.

21. A computer readable medium according to claim 13, wherein the information includes a sharing time of the shared file.

22. A computer readable medium according to claim 13, wherein the information includes a shared file name.

* * * * *